No. 708,425. Patented Sept. 2, 1902.
T. SUMMERTON.
APPARATUS FOR OPERATING VENETIAN BLINDS.
(Application filed Apr. 8, 1902.)
(No Model.)

Witnesses
E. J. Anstiss
J. H. Murray

Inventor
Thomas Summerton
By his Attorney
Henric H. Rayward

UNITED STATES PATENT OFFICE.

THOMAS SUMMERTON, OF CHRISTCHURCH, NEW ZEALAND.

APPARATUS FOR OPERATING VENETIAN BLINDS.

SPECIFICATION forming part of Letters Patent No. 708,425, dated September 2, 1902.

Application filed April 8, 1902. Serial No. 101,966. (No model.)

*To all whom it may concern:*

Be it known that I, THOMAS SUMMERTON, a subject of His Majesty the King of Great Britain and Ireland, residing at Armagh street, Christchurch, in the Colony of New Zealand, have invented an Improved Apparatus for Operating Venetian Blinds, of which the following is a specification.

My invention relates to means employed for raising and lowering Venetian blinds and securing them in any desired position.

I use the ordinary cords passing through and gathering up the slats of the blind, my invention consisting in an improved arrangement for gripping the cords and means by which it is operated. The blind-cords pass over pulleys mounted in a bracket fixed upon the headboard, and each cord passes beneath a gripper consisting of a pivoted lever, the lower end of which is notched or serrated and which normally falls upon and grips the cord. A trip-lever, also pivoted in the bracket, has a cross-bar which when the trip-lever is operated contacts with projections upon the grippers and causes their opposite ends to rise and release the cords. A drum revolving with the cord-pulleys referred to has a plurality of recesses each adapted to receive the end of the trip-lever which rides upon the drum and is weighted to cause it to fall into the recess immediately beneath it when the drum is at rest or revolving sufficiently slow for it to do so. When the end of the trip-lever is in a recess, the grippers are free to act upon the cords; but when the cords are pulled the drum is revolved, the end of the trip-lever is raised out of the recess, and the bar upon its opposite end operates the grippers and releases the cords.

I will now describe my invention more to detail by the aid of the drawings, wherein—

Figure 1:
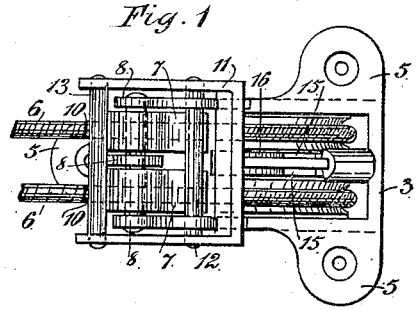
Figure 2:
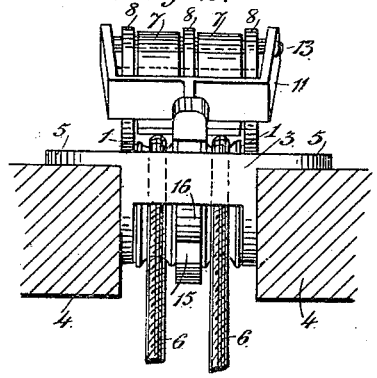
Figure 3:
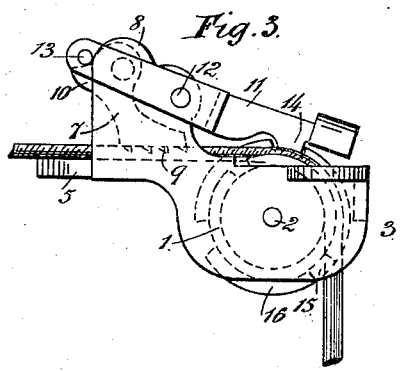
Figure 4:
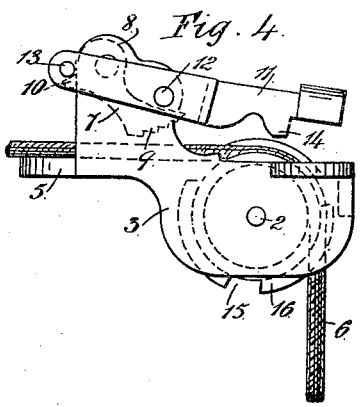

Figure 1 is a plan; Fig. 2, an end elevation; Fig. 3, a side elevation showing the cords gripped; Fig. 4, a similar elevation showing the cords released.

The same numerals of reference indicate the same parts throughout the figures.

The cord-pulleys 1 revolve upon the spindle 2, fixed in the bracket 3, which is secured to the headboard 4 of the window by screws passing through the holes in lugs 5. The blind-cords 6 pass over the cord-pulleys 1, and each cord passes beneath one of the grip-levers 7, which are pivoted in ears 8, formed on brackets 3, and have notches or serrations 9 at their lower ends, and projections 10 from their upper ends. The manner in which the grip-levers are pivoted causes them to fall upon the cords and the weight of the blind tends to make their grip secure. The bifurcated trip-lever 11 is fixed upon a spindle 12, journaled in the ears 8, and has a cross-bar 13 across its forward ends, adapted to contact with the projections 10, and thereby to operate the grip-levers. The rear end of trip-lever 11 is weighted and has a projection 14, adapted to take into any one of the recesses 15, formed in the drum 16, which revolves with the cord-pulleys 1. The forward side of each of the recesses 15 is beveled and the rear side formed diametrically to the drum, as shown, and the projection 14 upon the trip-lever is shaped to correspond, the result being that when the blind-cords are pulled and the drum thereby revolved the projection rises out of the recess it is in (see Fig. 4) and the grip-levers are simultaneously operated to release the cords. The projection 14 will continue to ride upon the drum and the grip-levers be held free of the cords until the drum ceases to revolve or revolves very slowly, when the projections will fall into one or other of the recesses (see Fig. 3) and the blind will be instantly held.

When more than two cords are used for a blind, a corresponding number of grip-levers must be used and the cross-bar must be extended to operate them all simultaneously.

What I claim as my invention, and desire to secure by Letters Patent, is—

1. The combination in apparatus for the purpose indicated of a drum having recesses upon its circumferential periphery and revolving with the cord-pulleys of a Venetian blind, operating-cords passing over said cord-pulleys, a pivoted trip-lever the rear end of which has a projection adapted to engage in any one of said recesses, a cross-bar at the forward end of said trip-lever, and pivoted grip-levers serrated at their lower ends and having projections from their upper ends adapted to be engaged by said cross-bar when the rear end of the trip-lever is raised as specified.

2. The combination in apparatus for the purpose indicated of grip-levers having serrations at their lower ends said levers being pivoted above the operating-cords of a Venetian blind and normally tending to grip same by the weight of the blind upon the cords projections from the grip-levers, a pivoted trip-lever having a bar adapted to engage such projections a projection from the rear end of the trip-lever adapted to engage in any one of a plurality of recesses in the periphery of a drum revolving with the pulleys which guide the operating-cords as specified.

In witness whereof I have hereunto set my hand in presence of two witnesses.

THOMAS SUMMERTON.

Witnesses:
GEO. HUTCHINSON,
HENRIE H. RAYWARD.